US011933319B2

(12) United States Patent
Nishimori et al.

(10) Patent No.: US 11,933,319 B2
(45) Date of Patent: Mar. 19, 2024

(54) MOTOR-DRIVEN COMPRESSOR, HOUSING STRUCTURE FOR MOTOR-DRIVEN COMPRESSOR, AND METHOD OF INSTALLING SOUNDPROOF COVER ON MOTOR-DRIVEN COMPRESSOR

(71) Applicant: KABUSHIKI KAISHA TOYOTA JIDOSHOKKI, Aichi-ken (JP)

(72) Inventors: Noritaka Nishimori, Kariya (JP); Toshiyuki Kobayashi, Kariya (JP); Ryuji Watanabe, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 18/119,631

(22) Filed: Mar. 9, 2023

(65) Prior Publication Data

US 2023/0296113 A1 Sep. 21, 2023

(30) Foreign Application Priority Data

Mar. 18, 2022 (JP) ................................. 2022-043985

(51) Int. Cl.
*F04D 29/66* (2006.01)

(52) U.S. Cl.
CPC ........ *F04D 29/663* (2013.01); *F05D 2230/60* (2013.01)

(58) Field of Classification Search
CPC ..................................................... F04D 29/663
See application file for complete search history.

(56) References Cited

U.S. PATENT DOCUMENTS

2020/0248928 A1* 8/2020 Chothave .............. F04D 29/664

FOREIGN PATENT DOCUMENTS

JP 2013-194673 9/2013
JP 2013194673 A * 9/2013

* cited by examiner

*Primary Examiner* — Sabbir Hasan
(74) *Attorney, Agent, or Firm* — Greenblum & Bernstein, P.L.C.

(57) ABSTRACT

A motor-driven compressor, a housing structure for a motor-driven compressor, and a method of installing a soundproof cover on a motor-driven compressor are provided. A soundproof cover includes layers that include a first layer and a second layer. The first layer is placed over a housing, and the second layer is placed over the first layer. Each of the layers includes a first segment and a second segment. A second selection layer is located inward of a first selection layer. A boundary in the second selection layer is located above the boundary of the first selection layer.

4 Claims, 4 Drawing Sheets

MOTOR-DRIVEN COMPRESSOR, HOUSING STRUCTURE FOR MOTOR-DRIVEN COMPRESSOR, AND METHOD OF INSTALLING SOUNDPROOF COVER ON MOTOR-DRIVEN COMPRESSOR

BACKGROUND

1. Field

The present disclosure relates to a motor-driven compressor, a housing structure for a motor-driven compressor, and a method of installing a soundproof cover on a motor-driven compressor.

2. Description of Related Art

A motor-driven compressor includes a compression unit, an electric motor, and a housing. The compression unit compresses a fluid. The electric motor drives the compression unit. The housing accommodates the compression unit and the electric motor.

For the purpose of reducing noise of a motor-driven compressor, the housing of the motor-driven compressor may be covered with, for example, a soundproof shell described in Japanese Laid-Open Patent Publication No. 2013-194673. The soundproof shell includes an upper segment and a lower segment. The upper segment covers an upper part of the housing. The lower segment covers a lower part of the housing.

The upper segment and the lower segment each include a sound absorbing layer and a sound insulating layer. The sound absorbing layer is placed over the housing. The sound insulating layer is placed over the sound absorbing layer. The upper segment and the lower segment abut each other to cover the housing. The soundproof shell is formed by multiple layers including the sound absorbing layers and the sound insulating layers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a motor-driven compressor includes a compression unit that compresses a fluid, an electric motor that drives the compression unit, a housing that accommodates the compression unit and the electric motor, and a soundproof cover that covers the housing. The soundproof cover includes layers that include a first layer and a second layer. The first layer is placed over the housing, and the second layer is placed over the first layer. Each of the layers includes a first segment and a second segment. Each first segment is located above a boundary between the first segment and the corresponding second segment. Each second segment is located below the corresponding boundary. One of the layers is defined as a first selection layer. Another one of the layers that is located inward of the first selection layer is defined as a second selection layer. The boundary in the second selection layer is located above the boundary of the first selection layer.

With the above-described configuration, the boundaries in the multiple layers forming the soundproof cover include boundaries that are displaced from each other in the up-down direction. In other words, the boundaries in all the layers do not extend continuously from the housing to the outside of the soundproof cover. Thus, the noise generated by the compression unit and the electric motor is unlikely to leak to the outside of the soundproof cover. Therefore, the noise reduction effect of the soundproof cover is unlikely to be reduced.

Further, the boundary in the second selection layer is located above the boundary of the first selection layer. For this reason, even if water enters the boundary in the outermost layer located at the outermost position among all the layers to reach the boundary in the first selection layer, the water is unlikely to reach the boundary in the second selection layer. Thus, even if water enters the motor-driven compressor from the outside, the water is unlikely to reach the housing. Therefore, it is possible to maintain the noise reduction effect of the soundproof cover while preventing water from reaching the housing.

If the boundary between the sound absorbing layer of the upper segment and the sound absorbing layer of the lower segment and the boundary between the sound insulating layer of the upper segment and the sound insulating layer of the lower segment are located at the same position in the up-down direction, water may enter the housing from the outside of the soundproof shell through the boundaries. In addition, although the soundproof shell reduces the noise of the motor-driven compressor, the noise reduction effect may be reduced if all the boundaries are located at the same position in the up-down direction. The above-described configuration prevents such possible disadvantages.

In the above-described motor-driven compressor, the boundary in an outermost layer, which is located at an outermost position among the layers, is preferably located at a lowermost position among the boundaries in the layers.

With the above-described configuration, water entering the boundary in the outermost layer is unlikely to pass through the boundaries in the layers on the inner side of the outermost layer. Therefore, water is unlikely to reach the housing.

In a second general aspect, a housing structure for a motor-driven compressor includes a cylindrical housing and a cylindrical soundproof cover that covers the housing. The soundproof cover includes layers that include a first selection layer and a second selection layer. The second selection layer is located inward of the first selection layer. Each of the layers includes a first segment and a second segment that is located below the first segment. A length of the first segment of the first selection layer in a circumferential direction is greater than a length of the first segment of the second selection layer in a circumferential direction.

In a third general aspect, a method of installing a soundproof cover on a motor-driven compressor includes providing first segments and second segments. Each of the first segments and each of the second segments form corresponding one of layers that form the soundproof cover. The soundproof cover covers a housing of the motor-driven compressor. The layers include a first layer and a second layer. The first layer is placed over the housing, and the second layer is placed over the first layer. Each first segment is located above a boundary between the first segment and the corresponding second segment. Each second segment is located below the corresponding boundary. One of the layers is defined as a first selection layer. Another one of the layers that is located inward of the first selection layer is defined as a second selection layer. The boundary in the second selection layer is located above the boundary of the first selection layer. The method also includes forming a first intermediate by stacking the first segments of the layers together, forming a second intermediate by stacking the second segments of the layers together, and covering the housing with the first intermediate and the second intermediate by joining the first intermediate and the second intermediate to each other.

With the above-described installing method, the first segments of the multiple layers are stacked together in advance to form the first intermediate. Also, the second segments of the multiple layers are stacked together in advance to form the second intermediate. This configuration simplifies the final step of attaching the soundproof cover to the housing of the motor-driven compressor.

In the motor-driven compressor on which the soundproof cover is installed by the above-described installing method, the boundaries in the multiple layers forming the soundproof cover include boundaries that are displaced from each other in the up-down direction. In other words, the boundaries in all the layers do not extend continuously from the housing to the outside of the soundproof cover. Thus, the noise generated by the compression unit and the electric motor is unlikely to leak to the outside of the soundproof cover. Therefore, the noise reduction effect of the soundproof cover is unlikely to be reduced.

Further, the boundary in the second selection layer is located above the boundary of the first selection layer. For this reason, even if water enters the boundary in the outermost layer located at the outermost position among all the layers to reach the boundary in the first selection layer, the water is unlikely to reach the boundary in the second selection layer. Thus, even if water enters the motor-driven compressor from the outside, the water is unlikely to reach the housing. Therefore, it is possible to maintain the noise reduction effect of the soundproof cover while preventing water from reaching the housing.

The present disclosure maintains the noise reduction effect of the soundproof cover, while preventing water from reaching the housing.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A motor-driven compressor 10 according to a first embodiment will now be described with reference to FIGS. 1 to 3. The motor-driven compressor 10 of the present embodiment is used, for example, in a vehicle air conditioner.

<Motor-Driven Compressor>

Figure 1:
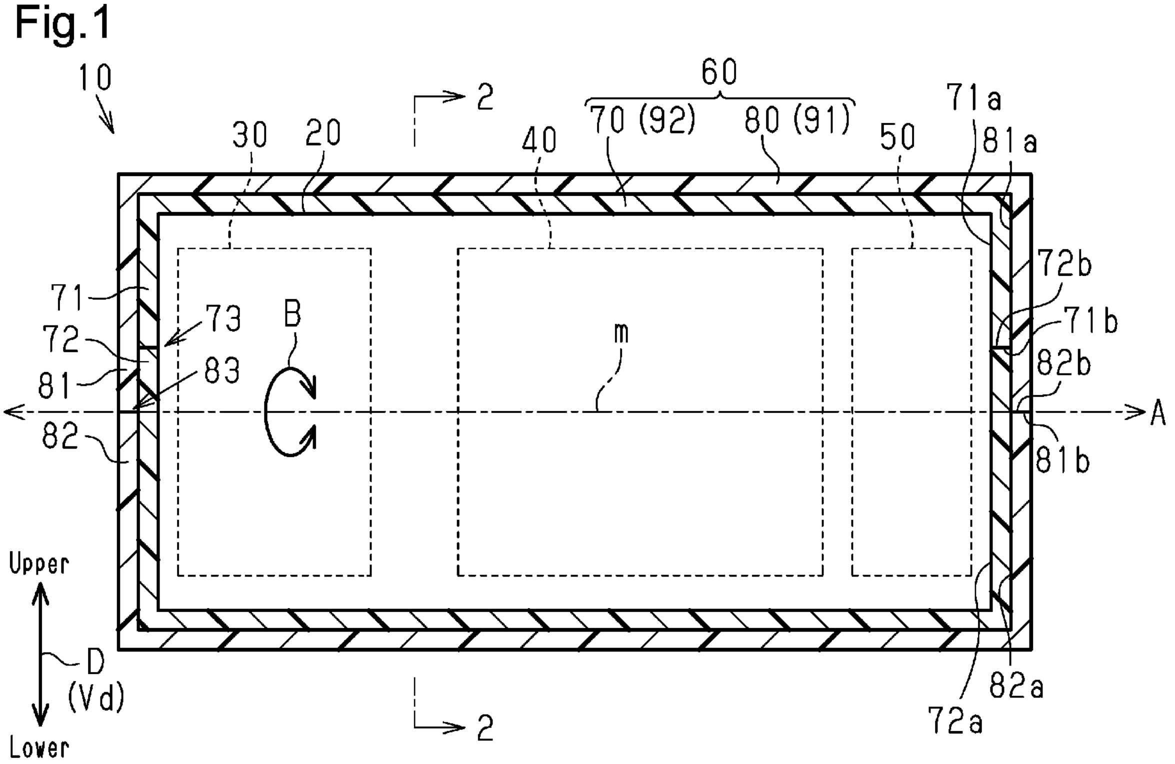
FIG. 1 is a cross-sectional view of a motor-driven compressor according to a first embodiment of the present disclosure.

As shown in FIG. 1, the motor-driven compressor 10 includes a housing 20, a compression unit 30, an electric motor 40, an inverter 50, and a soundproof cover 60. The housing 20 is cylindrical. The housing 20 is made of metal. The housing 20 is made of, for example, aluminum. A direction in which an axis m of the housing 20 extends is defined as an axial direction A. A direction in which a circle around the axis m of the housing 20 extends is defined as a circumferential direction a circumferential direction B. The housing 20 includes multiple housing components separable in the axial direction A.

The compression unit 30 compresses refrigerant, which is fluid. The electric motor 40 drives the compression unit 30. The inverter 50 drives the electric motor 40. The housing 20 accommodates the compression unit 30, the electric motor 40, and the inverter 50. The compression unit 30, the electric motor 40, and the inverter 50 are arranged in that order in the axial direction A of the housing 20.

The electric motor 40 is driven by power supplied from the inverter 50. The compression unit 30 is of a scroll type that includes a fixed scroll and a movable scroll (neither is shown). As the electric motor 40 is driven, the compression unit 30 compresses refrigerant that is drawn into the housing 20.

<Soundproof Cover>

Figure 2:
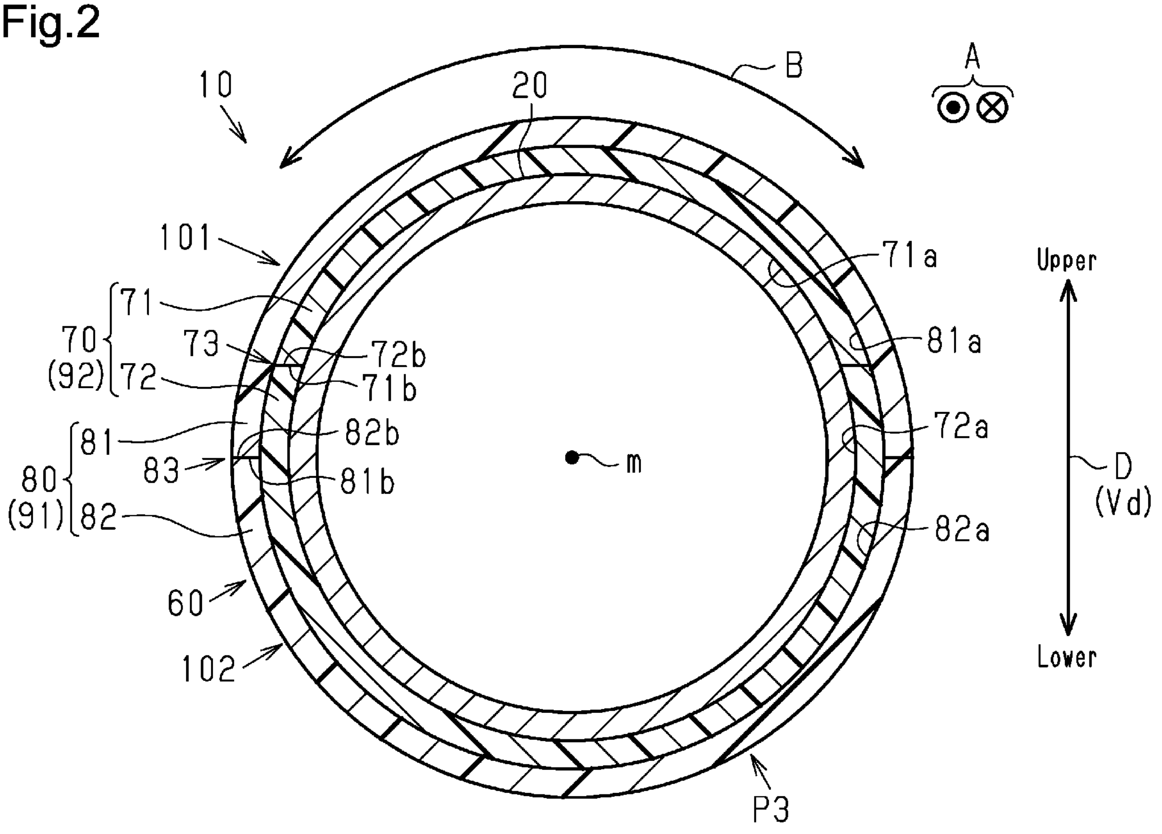
FIG. 2 is a cross-sectional view taken along line 2-2 in FIG. 1, illustrating the motor-driven compressor according to the first embodiment.

As shown in FIGS. 1 and 2, the soundproof cover 60 covers the housing 20. The soundproof cover 60 includes multiple layers. In the present embodiment, the soundproof cover 60 includes two layers. The two layers are defined as a first layer 70 and a second layer 80. The first layer 70 is placed over the housing 20. The second layer 80 is placed over the first layer 70. The second layer 80 covers the first layer 70. In the present embodiment, the first layer 70 is made of, for example, a urethane material or nonwoven fabric. The first layer 70 is made of a material having high sound absorbing properties. In the present embodiment, the second layer 80 is made of, for example, polypropylene, polyamide, acrylonitrile-butadiene-styrene (ABS) plastic, or olefin-based elastomer. In the present embodiment, the second layer 80 is made of a material having high sound insulating properties.

The first layer 70 is provided to conform to the outer shape of the housing 20. The first layer 70 includes a first segment 71 and a second segment 72. The first segment 71 includes a first accommodating recess 71*a*. The first accommodating recess 71*a* opens toward the second segment 72. The second segment 72 includes a second accommodating recess 72*a*. The second accommodating recess 72*a* opens toward the first segment 71. The first accommodating recess 71*a* and the second accommodating recess 72*a* have shapes that conform to the outer shape of the housing 20.

The first segment 71 includes a first opening end face 71*b*. The first opening end face 71*b* is an annular flat surface and surrounds the opening of the first accommodating recess 71*a*, which faces the second segment 72. The first opening end face 71*b* is a flat surface that extends in the horizontal direction. The second segment 72 includes a second opening end face 72*b*. The second opening end face 72*b* is an annular flat surface and surrounds the opening of the second accommodating recess 72*a*, which faces the first segment 71. The second opening end face 72*b* is a flat surface that extends in the horizontal direction. The term "annular" as used in this description may refer to any structure that forms a loop, or a continuous shape with no ends. "Annular" shapes include but are not limited to a circular shape, an elliptic shape, and a polygonal shape with sharp or rounded corners.

The first opening end face 71*b* and the second opening end face 72*b* are in contact with each other over the entire periphery. A portion in the first layer 70 at which the first opening end face 71*b* and the second opening end face 72*b* are in contact with each other is a boundary 73 between the first segment 71 and the second segment 72. The first segment 71 is disposed above the boundary 73, that is, at a position corresponding to an upper part of the housing 20. The second segment 72 is disposed below the boundary 73, that is, at a position corresponding to a lower part of the housing 20. The upper part of the housing 20 refers to an upper part of the housing 20 in the vertical direction Vd. The lower part of the housing 20 refers to a lower part of the housing 20 in the vertical direction Vd.

The second layer 80 is provided to conform to the outer shape of the first layer 70. The second layer 80 includes a first segment 81 and a second segment 82. The first segment 81 includes a first accommodating recess 81*a*. The first accommodating recess 81*a* opens toward the second segment 82. The second segment 82 includes a second accommodating recess 82*a*. The second accommodating recess 82*a* opens toward the first segment 81. The first accommodating recess 81*a* and the second accommodating recess 82*a* have shapes that conform to the outer shape of the first layer 70.

The first segment 81 includes a first opening end face 81*b*. The first opening end face 81*b* is an annular flat surface and surrounds the opening of the first accommodating recess 81*a*, which faces the second segment 82. The first opening end face 81*b* is a flat surface that extends in the horizontal direction. The second segment 82 includes a second opening end face 82*b*. The second opening end face 82*b* is an annular flat surface and surrounds the opening of the second accommodating recess 82*a*, which faces the first segment 81. The second opening end face 82*b* is a flat surface that extends in the horizontal direction.

The first opening end face 81*b* and the second opening end face 82*b* are in contact with each other over the entire periphery. A portion in the second layer 80 at which the first opening end face 81*b* and the second opening end face 82*b* are in contact with each other is a boundary 83 between the first segment 81 and the second segment 82. The first segment 81 is disposed above the boundary 83, that is, at a position corresponding to an upper part of the housing 20. The second segment 82 is disposed below the boundary 83, that is, at a position corresponding to a lower part of the housing 20.

A direction in which the first segments 71, 81 and the second segments 72, 82 are joined to each other is defined as an up-down direction D. In the present embodiment, the up-down direction D agrees with the vertical direction Vd. For example, the up-down direction D may be slightly inclined with respect to the vertical direction Vd. The up-down direction D may be inclined with respect to the vertical direction Vd to such an extent that the first segments 71, 81 are located at least above the second segments 72, 82 in the vertical direction Vd.

As shown in FIG. 2, a length of the first segment 71 of the first layer 70 in the circumferential direction B is shorter than a length of the second segment 72 of the first layer 70 in the circumferential direction B. The size of the first segment 71 is smaller than the size of the second segment 72. Thus, the boundary 73 between the first segment 71 and the second segment 72 is located above the axis m of the housing 20 in the up-down direction D due to the difference in size between the first segment 71 and the second segment 72.

A length of the first segment 81 of the second layer 80 in the circumferential direction B is the same as a length of the second segment 82 of the second layer 80 in the circumferential direction B. The size of the first segment 81 is the same as the size of the second segment 82. Thus, a boundary 83 between the first segment 81 and the second segment 82 is disposed at the same position as the axis m of the housing 20 in the up-down direction D.

<First Selection Layer, Second Selection Layer, Outermost Layer>

As shown in FIGS. 1 and 2, the layers 70, 80 form the soundproof cover 60. The second layer 80, which is one of the layers 70, 80, is defined as a first selection layer 91, and the first layer 70, which is a layer located inward of the first selection layer 91, is defined as a second selection layer 92. The boundary 73 in the second selection layer 92 is located above the boundary 83 in the first selection layer 91 in the up-down direction D. The boundary 83 in the second layer 80, which is the outermost layer located at the outermost position of the layers 70, 80, is located at the lowermost position among the boundaries 73, 83 in the layers 70, 80 in the up-down direction D.

<Method of Installing Soundproof Cover on Motor-Driven Compressor>

Figure 3:
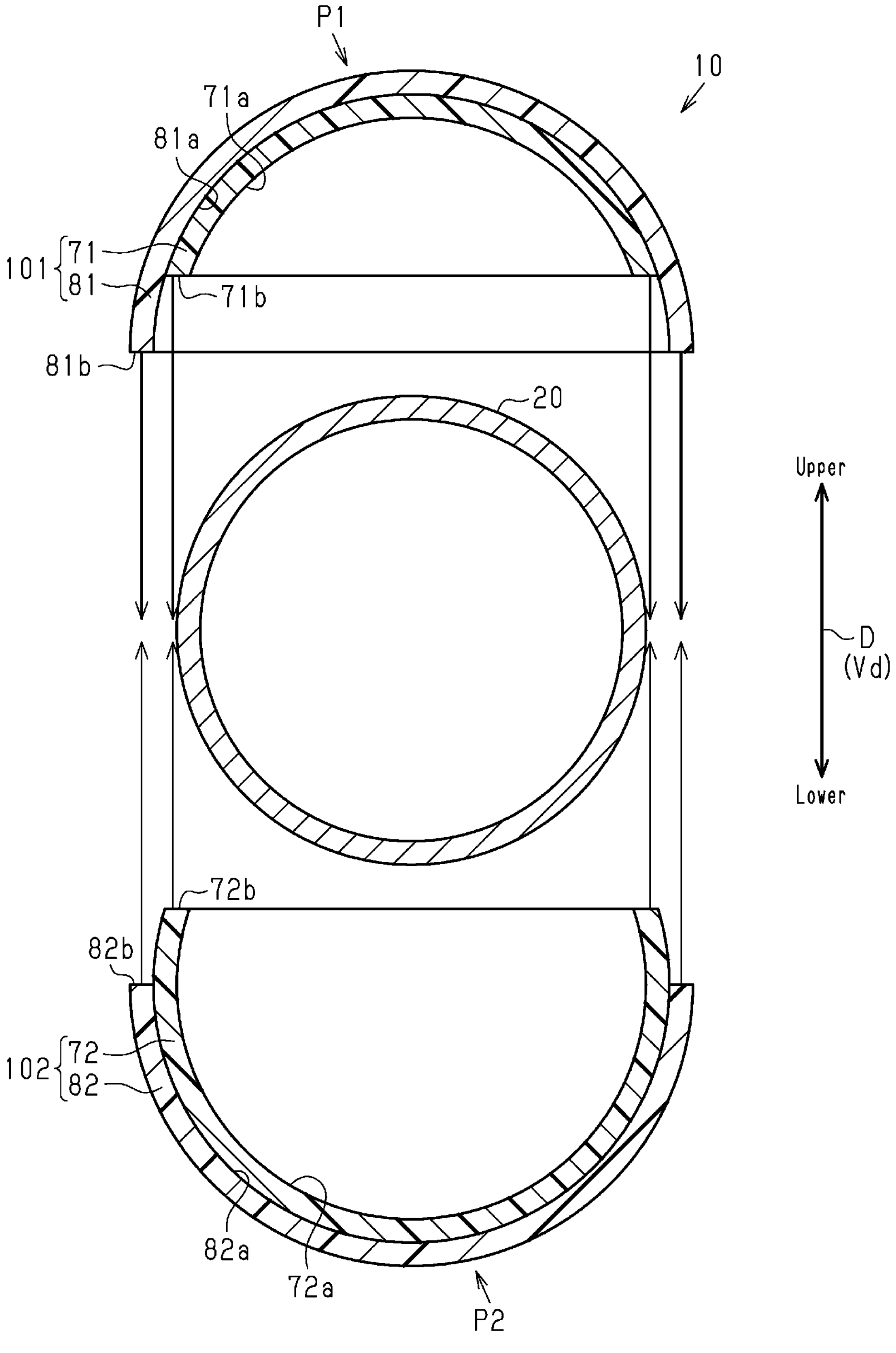
FIG. 3 is a cross-sectional view illustrating a method according to the first embodiment for manufacturing the motor-driven compressor shown in FIG. 1.

As shown in FIGS. 2 and 3, a method of installing the soundproof cover 60 on the motor-driven compressor 10 includes a first step P1, a second step P2, and a third step P3.

As shown in FIG. 2, the first step P1 is a step of stacking the first segment 71 of the first layer 70 and the first segment 81 of the second layer 80 together. A first intermediate 101 is formed by stacking the first segment 71 of the first layer 70 and the first segment 81 of the second layer 80 together. That is, the first step P1 is a step of forming the first intermediate 101 by stacking the first segments 71, 81 of the layers 70, 80 together.

The first segment 71 of the first layer 70 is accommodated in the first accommodating recess 81*a* of the first segment 81 of the second layer 80. The entire first segment 71 of the first layer 70 is accommodated inside the first segment 81 of the second layer 80. The entire outer surface of the first segment 71 of the first layer 70 is in contact with the inner surface of the first accommodating recess 81*a* of the first segment 81 of the second layer 80. In the first intermediate 101, the first opening end face 71*b* of the first segment 71 of the first layer 70 is parallel with the first opening end face 81*b* of the first segment 81 of the second layer 80.

The second step P2 is a step of stacking the second segment 72 of the first layer 70 and the second segment 82 of the second layer 80 together. A second intermediate 102 is formed by stacking the second segment 72 of the first layer 70 and the second segment 82 of the second layer 80 together. That is, the second step P2 is a step of forming the second intermediate 102 by stacking the second segments 72, 82 of the layers 70, 80 together.

The second segment 72 of the first layer 70 is accommodated in the second accommodating recess 82*a* of the second segment 82 of the second layer 80. Part of the second segment 72 of the first layer 70 protrudes from the opening of the second segment 82 of the second layer 80. The second opening end face 72*b* of the second segment 72 of the first layer 70 protrudes outward from the second segment 82 of the second layer 80. Part of the outer surface of the second segment 72 of the first layer 70 is in contact with the entire inner surface of the second accommodating recess 82*a* of the second segment 82 of the second layer 80. In the second intermediate 102, the second opening end face 72*b* of the second segment 72 of the first layer 70 is parallel with the second opening end face 82*b* of the second segment 82 of the second layer 80.

As shown in FIGS. 2 and 3, the third step P3 is executed after the first step P1 and the second step P2 are completed. In the third step P3, the first intermediate 101 is arranged above the housing 20, and the second intermediate 102 is arranged below the housing 20.

The third step P3 is a step of joining the first intermediate 101 and the second intermediate 102 to each other by bringing the first intermediate 101 and the second intermediate 102 close to each other. The first opening end face 71*b* of the first intermediate 101 and the second opening end face 72*b* of the second intermediate 102 are brought into contact with each other, and the first opening end face 81*b* of the first intermediate 101 and the second opening end face 82*b* of the second intermediate 102 are brought into contact with each other. Then, as shown in FIG. 3, the housing 20 is covered with the first intermediate 101 and the second intermediate 102. That is, the third step P3 is a step of covering the housing 20 with the first intermediate 101 and the second intermediate 102 by joining the first intermediate 101 and the second intermediate 102 to each other.

[Operation of Present Embodiment]

Operation of the present embodiment will now be described.

In the present embodiment, when the compression unit 30 and the electric motor 40 are driven, noise is transmitted via the housing 20. However, since the housing 20 is covered with the soundproof cover 60, the noise of the motor-driven compressor 10 is reduced.

The boundaries 73, 83 in the layers 70, 80, which form the soundproof cover 60, are displaced from each other in the up-down direction D. That is, the boundaries 73, 83 in all the layers 70, 80 do not extend continuously from the housing 20 to the outside of the soundproof cover 60. Thus, noise generated from the compression unit 30 and the electric motor 40 is unlikely to leak to the outside of the soundproof cover 60. Therefore, the noise reduction effect of the soundproof cover 60 is unlikely to be reduced.

Also, the boundary 73 in the second selection layer 92 is located above the boundary 83 in the first selection layer 91. For this reason, even if water reaches the boundary 83 in the second layer 80, which is the outermost layer located at the outermost position among all the layers 70, 80 and is the first selection layer 91, the water is unlikely to reach the boundary 73 in the second selection layer 92. Thus, even if water enters the motor-driven compressor 10 from the outside, the water is unlikely to reach the housing 20.

[Advantages of Present Embodiment]

The present embodiment has the following advantages.

(1-1) The boundaries 73, 83 in the layers 70, 80, which form the soundproof cover 60, are displaced from each other in the up-down direction D. Also, the boundary 73 in the second selection layer 92 is located above the boundary 83 in the first selection layer 91. Therefore, it is possible to maintain the noise reduction effect of the soundproof cover 60 while preventing water from reaching the housing 20.

(1-2) The boundary 83 in the second layer 80, which is the outermost layer located at the outermost position among all the layers 70, 80, is located at the lowermost position among the boundaries 73, 83 in all the layers 70, 80. For this reason, water entering the boundary 83 in the second layer 80 is unlikely to pass through the boundary 73 in the first layer 70, which is located inward of the second layer 80. Therefore, water is unlikely to reach the housing 20.

(1-3) According to the method of installing the soundproof cover 60 on the motor-driven compressor 10 of the present embodiment, the first segments 71, 81 of the respective layers 70, 80 are stacked together in advance to form the first intermediate 101. Then, the second segments 72, 82 of the respective layers 70, 80 are stacked together in advance to form the second intermediate 102. This configuration simplifies the final step of attaching the soundproof cover 60 to the housing 20 of the motor-driven compressor 10.

A motor-driven compressor 10 according to a second embodiment will now be described with reference to FIG. 4. The main difference of the present embodiment from the first embodiment is that the soundproof cover 60 includes a greater number of layers. The differences will be described, and like or the same reference numerals are given to those components that are like or the same as the corresponding components of the first embodiment, and detailed explanations are omitted.

<Soundproof Cover>

Figure 4:
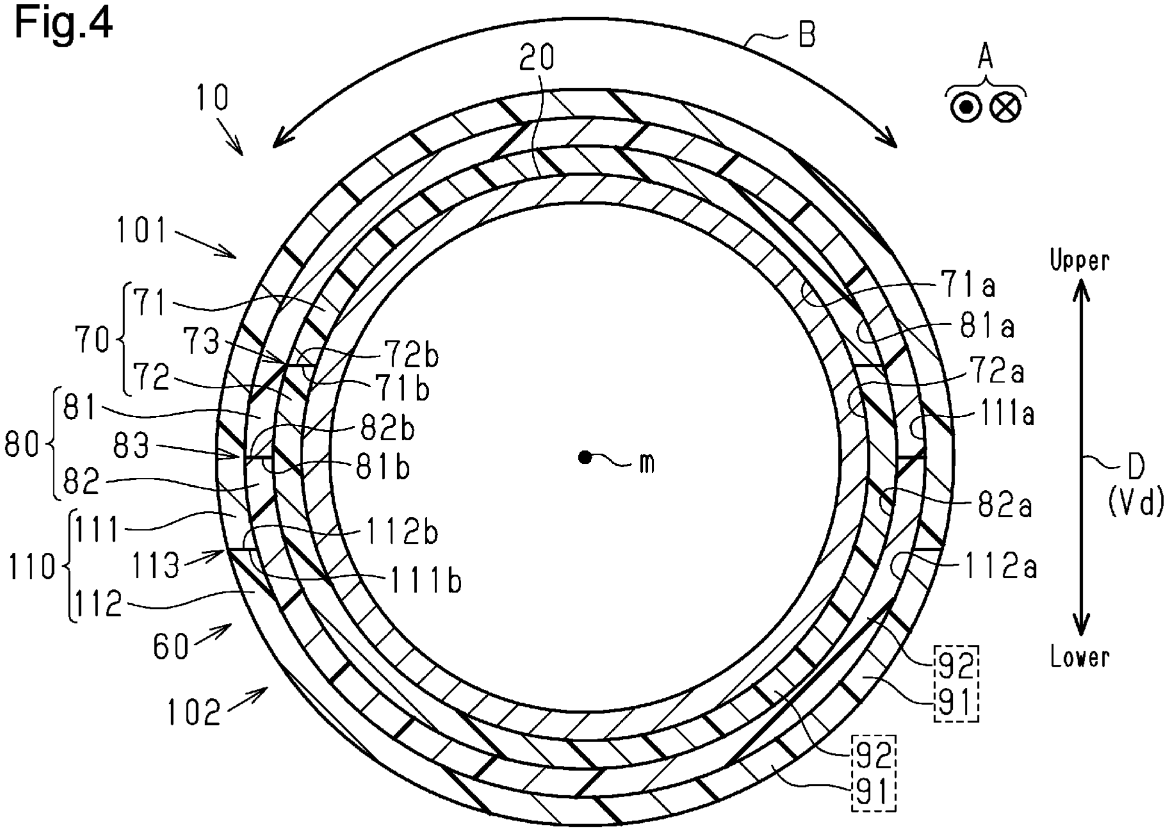
FIG. 4 is a cross-sectional view of a motor-driven compressor according to a second embodiment of the present disclosure.

As shown in FIG. 4, the soundproof cover 60 includes a third layer 110. The third layer 110 is stacked on the second layer 80. The third layer 110 covers the second layer 80. The third layer 110 is provided to conform to the outer shape of the second layer 80. The soundproof cover 60 includes multiple layers 70, 80, and 110, which at least include the first layer 70 and the second layer 80.

In the present embodiment, the third layer 110 is formed of a material having high vibration damping properties, such as a closed cell rubber sheet or a semi-closed cell rubber sheet. The third layer 110 includes a first segment 111 and a second segment 112. The first segment 111 includes a first accommodating recess 111*a*. The first accommodating recess 111*a* opens toward the second segment 112. The second segment 112 includes a second accommodating recess 112*a*. The second accommodating recess 112*a* opens toward the first segment 111. The first accommodating recess 111*a* and the second accommodating recess 112*a* have shapes that conform to the outer shape of the second layer 80.

The first segment 111 includes a first opening end face 111*b*. The first opening end face 111*b* is an annular flat surface and surrounds the opening of the first accommodating recess 111*a*, which faces the second segment 112. The first opening end face 111*b* is a flat surface that extends in the horizontal direction. The second segment 112 includes a second opening end face 112*b*. The second opening end face 112*b* is an annular flat surface and surrounds the opening of the second accommodating recess 112*a*, which faces the first segment 111. The second opening end face 112*b* is a flat surface that extends in the horizontal direction.

The first opening end face 111*b* and the second opening end face 112*b* are in contact with each other over the entire periphery. A portion in the third layer 110 at which the first opening end face 111*b* and the second opening end face 112*b* are in contact with each other is a boundary 113 between the first segment 111 and the second segment 112. The first segment 111 is disposed above the boundary 113, that is, at a position corresponding to an upper part of the housing 20. The second segment 112 is disposed below the boundary 113, that is, at a position corresponding to a lower part of the housing 20.

A length of the first segment 111 of the third layer 110 in the circumferential direction B is greater than a length of the second segment 112 of the third layer 110 in the circumferential direction B. The size of the first segment 111 is larger than the size of the second segment 112. Thus, the boundary 113 between the first segment 111 and the second segment 112 is located below the axis m of the housing 20 in the up-down direction D due to the difference in size between the first segment 111 and the second segment 112.

<First Selection Layer, Second Selection Layer, Outermost Layer>

The layers 70, 80, 110 form the soundproof cover 60. The third layer 110, which is one of the layers 70, 80, 110, is defined as a first selection layer 91, and the first layer 70, which is a layer located inward of the first selection layer 91, is defined as a second selection layer 92. The boundary 73 in the second selection layer 92 is located above the boundary 113 in the first selection layer 91 in the up-down direction D.

The layers 70, 80, 110 form the soundproof cover 60. The third layer 110, which is one of the layers 70, 80, 110, is defined as the first selection layer 91, and the second layer 80, which is a layer located inward of the first selection layer 91, is defined as the second selection layer 92. The boundary 83 in the second selection layer 92 is located above the boundary 113 in the first selection layer 91 in the up-down direction D.

The boundary 113 of the third layer 110, which is the outermost layer located at the outermost position among the layers 70, 80, 110, is located at the lowermost position among the boundaries 73, 83, 113 in the layers 70, 80, 110 in the up-down direction D.

<Method of Installing Soundproof Cover on Motor-Driven Compressor>

In the method of installing the soundproof cover 60 on the motor-driven compressor 10, the first step P1 includes an additional step of stacking the first segment 111 of the third layer 110 on the first segment 81 of the second layer 80. A first intermediate 101 is formed by stacking the first segment 71 of the first layer 70, the first segment 81 of the second layer 80, and the first segment 111 of the third layer 110 together. That is, the first step P1 is a step of forming the first intermediate 101 by stacking the first segments 71, 81, 111 of the layers 70, 80, 110 together.

The second step P2 includes an additional step of stacking the second segment 112 of the third layer 110 on the second segment 82 of the second layer 80. A second intermediate 102 is formed by stacking the second segment 72 of the first layer 70, the second segment 82 of the second layer 80, and the second segment 112 of the third layer 110 together. That is, the second step P2 is a step of forming the second intermediate 102 by stacking the second segments 72, 82, 112 of the layers 70, 80, 110 together.

The third step P3, which is described in the first embodiment, additionally brings the first opening end face 111*b* of the first intermediate 101 and the second opening end face 112*b* of the second intermediate 102 into contact with each other. That is, the third step P3 is a step of covering the housing 20 with the first intermediate 101 and the second intermediate 102 by joining the first intermediate 101 and the second intermediate 102 to each other.

[Operation of Present Embodiment]

Operation of the present embodiment will now be described.

The boundaries 73, 83, 113 in the layers 70, 80, 110, which form the soundproof cover 60, are displaced from each other in the up-down direction D. That is, the boundaries 73, 83, 113 in all the layers 70, 80, 110 do not linearly extend from the housing 20 to the outside of the soundproof cover 60. Thus, noise generated from the compression unit 30 and the electric motor 40 is unlikely to leak to the outside of the soundproof cover 60. Therefore, the noise reduction effect of the soundproof cover 60 is unlikely to be reduced.

In addition, the boundary 83 in the case in which the second layer 80 is defined as the second selection layer 92 is located above the boundary 113 in the case in which the third layer 110 is defined as the first selection layer 91. The boundary 73 in the case in which the first layer 70 is defined as the second selection layer 92 is located above the boundary 113 in the case in which the third layer 110 is defined as the first selection layer 91.

Therefore, even if water reaches the boundary 113 in the third layer 110, which is the first selection layer 91, the water is unlikely to reach the boundaries 73, 83 in the layers 70, 80, which can be defined as the second selection layer 92. Thus, even if water enters the motor-driven compressor 10 from the outside, the water is unlikely to reach the housing 20.

[Advantages of Present Embodiment]

The present embodiment has the following advantages.

(2-1) The boundaries 73, 83, 113 in the layers 70, 80, 110, which form the soundproof cover 60, are displaced from each other in the up-down direction D. Further, the boundaries 73, 83 in the layers 70, 80, which can be defined as the second selection layer 92, are located above the boundary 113 in the third layer 110, which is the first selection layer 91. Therefore, it is possible to maintain the noise reduction effect of the soundproof cover 60 while preventing water from reaching the housing 20.

(2-2) The boundary 113 in the third layer 110, which is the outermost layer located at the outermost position among the layers 70, 80, 110, is located at the lowermost position among the boundaries 73, 83, 113 in the layers 70, 80, 110. For this reason, water entering the boundary 113 in the third layer 110 is unlikely to pass through the boundaries 73, 83 in the layer 70, 80, which are located inward of the third layer 110. Therefore, water is unlikely to reach the housing 20.

[Modifications]

The above-described embodiments may be modified as follows. The above-described embodiments and the following modifications can be combined as long as the combined modifications remain technically consistent with each other.

In the second embodiment, the position of the boundary 113 in the third layer 110 may be changed as follows.

Figure 5:
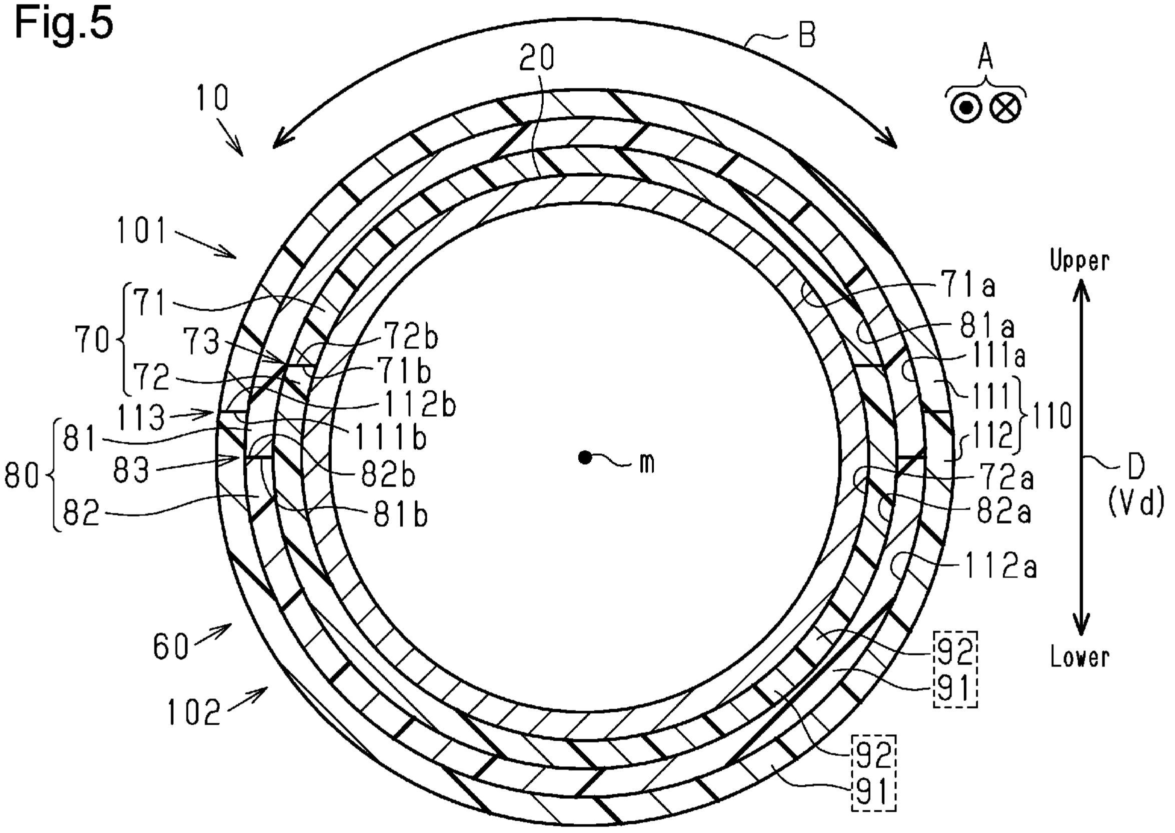
FIG. 5 is a cross-sectional view of a motor-driven compressor according to a modification of the present disclosure.

As shown in FIG. 5, the boundary 113 in the third layer 110 may be located between the boundary 73 in the first layer 70 and the boundary 83 in the second layer 80 in the up-down direction D. In this modification, the second layer 80 may be defined as the first selection layer 91, and the first layer 70 may be defined the second selection layer 92. Alternatively, the third layer 110 may be defined the first selection layer 91, and the first layer 70 may be defined as the second selection layer 92.

Figure 6:
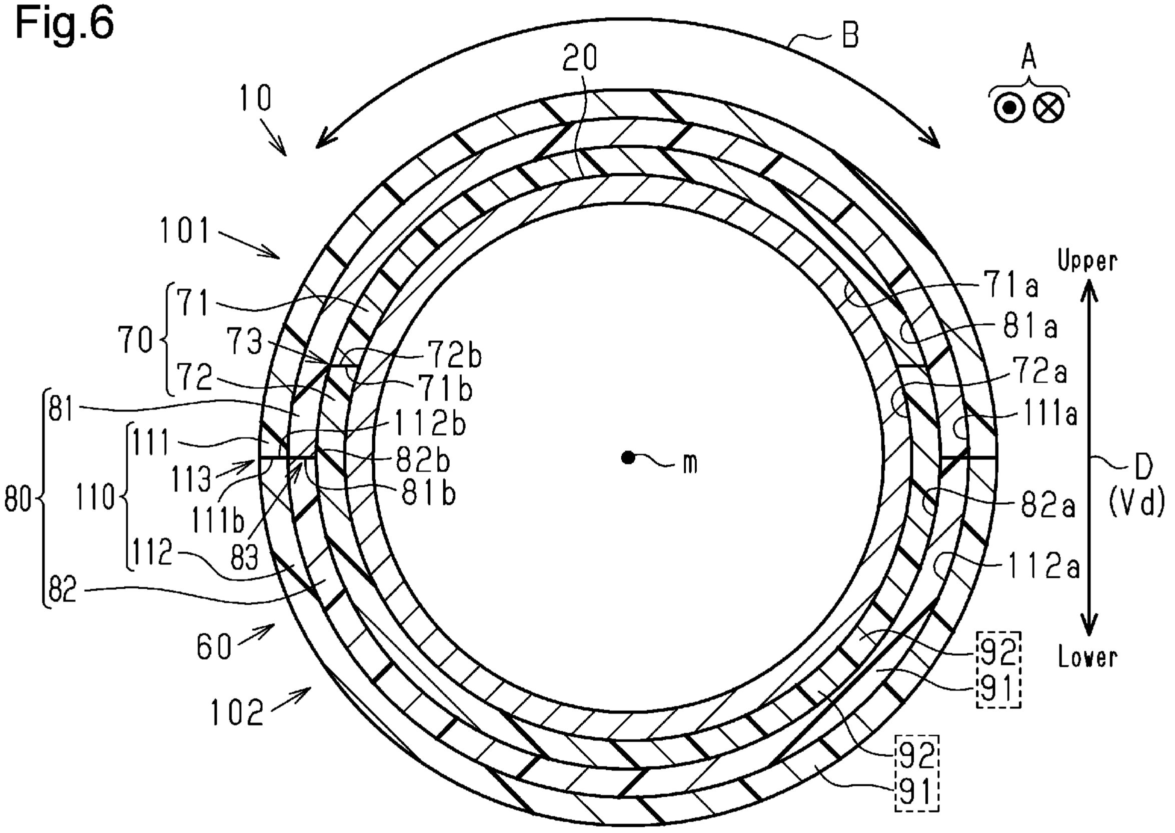
FIG. 6 is a cross-sectional view of a motor-driven compressor according to another modification of the present disclosure.

As shown in FIG. 6, the boundary 113 in the third layer 110 may be located at the same position as the boundary 83 in the second layer 80 in the up-down direction D. In this modification, the second layer 80 may be defined as the first selection layer 91, and the first layer 70 may be defined the second selection layer 92. Alternatively, the third layer 110 may be defined the first selection layer 91, and the first layer 70 may be defined as the second selection layer 92.

Figure 7:
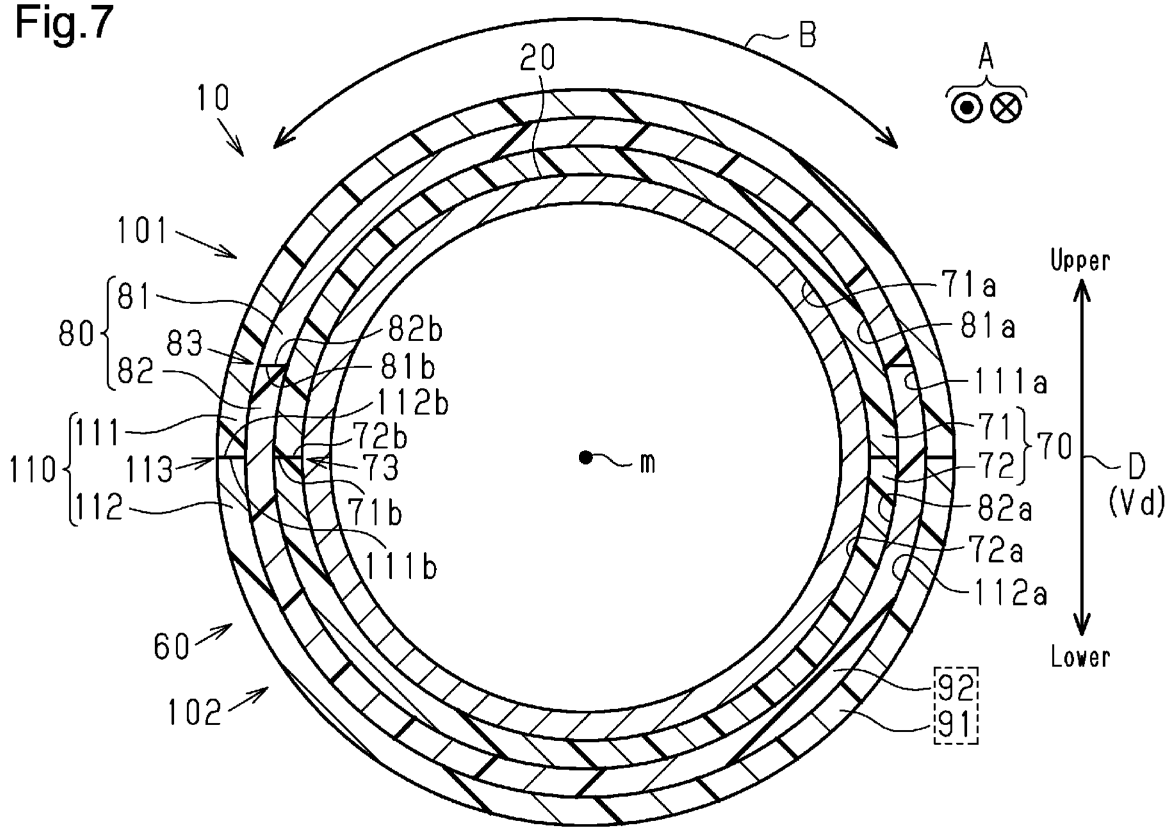
FIG. 7 is a cross-sectional view of a motor-driven compressor according to a further modification of the present disclosure.

As shown in FIG. 7, the boundary 73 in the first layer 70 may be located at the same position as the boundary 113 in the third layer 110 in the up-down direction D, and the boundary 83 in the second layer 80 may be located above the boundaries 73, 113 in the layers 70, 110. In this modification, the third layer 110 is defined as the first selection layer 91, and the second layer 80 is defined as the second selection layer 92.

In the modification shown in FIG. 7, the boundary 113 in the third layer 110 may be located below the boundary 73 in the first layer 70. In this modification, the third layer 110 may be defined as the first selection layer 91, and the second layer 80 may be defined the second selection layer 92. Alternatively, the third layer 110 may be defined the first selection layer 91, and the first layer 70 may be defined as the second selection layer 92.

In the modification shown in FIG. 7, the boundary 73 in the first layer 70 may be located below the boundary 113 in the third layer 110. In this modification, the third layer 110 is defined as the first selection layer 91, and the second layer 80 is defined as the second selection layer 92.

In the modification shown in FIG. 7, the boundary 83 in the second layer 80 may be located below the boundaries 73, 113 in the layers 70, 110. In this modification, the second layer 80 is defined as the first selection layer 91, and the first layer 70 is defined as the second selection layer 92. In the second embodiment and the above-described modifications, the sizes of the first segment and the second segment in at least one of all the layers 70, 80, 110 may be changed.

In the first embodiment, the boundary 73 in the first layer 70 may be located below the axis m of the housing 20. In this modification, the boundary 83 in the second layer 80 is displaced to be located below the boundary 73 in the first layer 70. That is, when the second layer 80 is defined as the first selection layer 91 and the first layer 70 is defined the second selection layer 92, the boundary 73 in the second selection layer 92 may be located above the boundary 83 in the first selection layer 91.

In the above-described embodiments and modifications, the first opening end faces 71*b*, 81*b*, 111*b* and the second opening end faces 72*b*, 82*b*, 112*b* are surfaces extending in the horizontal direction, but the present disclosure is not limited to this. For example, the first opening end faces 71*b*, 81*b*, 111*b* and the second opening end faces 72*b*, 82*b*, 112*b* may each have a step in the up-down direction D. The shapes of the first opening end faces 71*b*, 81*b*, 111*b* and the shapes of the second opening end face 72*b*, 82*b*, 112*b* may be changed. Such modifications are possible as long as the boundary in the second selection layer 92 is entirely located above the boundary in the first selection layer 91.

In each of the above-described embodiments, the first segment 71 and the second segment 72 may be coupled to each other by, for example, a hinge or the like. The first segment 81 and the second segment 82 may be coupled to each other by, for example, a hinge or the like. The first segment 111 and the second segment 112 may be coupled to each other by, for example, a hinge or the like.

In each of the above-described embodiments, the number of layers forming the soundproof cover 60 may be greater than three. Even in this modification, the boundary in the second selection layer 92 is arranged to be above the boundary in the first selection layer 91.

In each of the above-described embodiments, the housing 20 may include a portion that protrudes in a radial direction, which is orthogonal to the axis m of the housing 20. Further, the portion protruding from the housing 20 in a radial direction may also be covered by the soundproof cover 60. In this modification, the size of the first segment and the size of the second segment in one of the first selection layer 91 and the second selection layer 92 are changed such that the boundary in the second selection layer 92 is located above the boundary in the first selection layer 91.

In each of the above-described embodiments, the first layer 70 may be made of a material having high sound insulating properties. The second layer 80 may be made of a material having high sound absorbing properties. In addition, the third layer 110 may be made of a material having high sound absorbing properties or high sound insulating properties, and the first layer 70 or the second layer 80 may be made of a material having high vibration damping properties. The properties of the respective layers forming the soundproof cover 60, such as the sound absorbing properties, the sound insulating properties, or the vibration damping properties, may be changed in each layer. The soundproof cover 60 may be made of any material as long as the material has a soundproof function. The properties of multiple layers forming the soundproof cover 60 may have properties other than sound absorbing properties, sound insulating properties, or vibration damping properties.

In each of the above-described embodiments, the compression unit 30 is not limited to a scroll type, but may be, for example, a piston type or a vane type.

In each of the above-described embodiments, the motor-driven compressor 10 may be mounted on a fuel cell electric vehicle and use the compression unit 30 to compress air, which is a fluid supplied to the fuel cell.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor-driven compressor, comprising:

a compression unit that compresses a fluid;

an electric motor that drives the compression unit;

a housing that accommodates the compression unit and the electric motor; and a soundproof cover that covers the housing, wherein the soundproof cover includes a first layer and a second layer, the first layer being placed over the housing, and the second layer being placed over the first layer, the first layer having a boundary defined between two opposing segments of the first layer, wherein one of the two opposing segments of the first layer is located above the other of the two opposing segments of the first layer, the second layer having a boundary defined between two opposing segments of the second layer, wherein one of the two opposing segments of the second layer is located above the other of the two opposing segments of the second layer, the boundary of the first layer is located above the boundary of the second layer.

2. The motor-driven compressor according to claim 1, further comprising:

an outermost layer having a boundary defined between two opposing segments of the outermost layer, the outermost layer being placed over the second layer, and the boundary of the outermost layer is located at a position lower than both the boundary of the first layer and the boundary of the second layer.

3. The motor-driven compressor according to claim 1, wherein the first layer and the second layer are among a plurality of layers and the second layer is an outermost layer, and the boundary of the second layer is located at a position lower than each boundary of the plurality of layers.

4. A method of installing a soundproof cover on a motor-driven compressor, the method comprising:

providing a first layer having two opposing segments, providing a second layer having two opposing segments, wherein the first layer and the second layer form the soundproof cover, the soundproof cover covering a housing of the motor-driven compressor, the first layer being placed over the housing, and the second layer being placed over the first layer;

the first layer having a boundary defined between the two opposing segments of the first layer, wherein one of the two opposing segments of the first layer is located above the other of the two opposing segments of the first layer, the second layer having a boundary defined between the two opposing segments of the second layer, wherein one of the two opposing segments of the second layer is located above the other of the two opposing segments of the second layer, the boundary of the first layer is located above the boundary of the second layer;

forming a first intermediate by stacking the other of the two opposing segments of the first layer and the other of the two opposing segments of the second layer together;

forming a second intermediate by stacking the one of the two opposing segments of the first layer and the one of the two opposing segments of the second layer together; and covering the housing with the first intermediate and the second intermediate by joining the first intermediate and the second intermediate to each other.

* * * * *